United States Patent [19]

Carosi et al.

[11] 4,266,284
[45] May 5, 1981

[54] SYSTEMS FOR THE HANDLING AND DISTRIBUTING OF DATA

[75] Inventors: Franco Carosi; Tito Reggiani, both of Rome, Italy

[73] Assignee: Voxson S.p.A., Italy

[21] Appl. No.: 34,538

[22] Filed: Apr. 30, 1979

[51] Int. Cl.³ .............................................. G11C 13/00
[52] U.S. Cl. ..................................... 365/189; 365/238
[58] Field of Search ................ 365/222, 238, 189, 174

[56] References Cited

U.S. PATENT DOCUMENTS

| 3,737,879 | 5/1973 | Greene et al. | 365/222 |
| 3,772,658 | 11/1973 | Sarlo | 365/238 |
| 3,921,148 | 11/1975 | Ophir et al. | 365/189 |

Primary Examiner—Terrell W. Fears
Attorney, Agent, or Firm—Beveridge, De Grandi, Kline & Lunsford

[57] ABSTRACT

System for handling and distributing of data comprising a local ordering and memorizing center connected by a common line to a plurality of peripheral user equipments, wherein said peripheral user equipments are provided each with a memory unit adapted to receive and store all the information contained in the local memorizing center, the memory unit of the peripheral user equipment being arranged so as to allow its use independently upon the operation of the ordering center, means being provided for updating the information stored in the memory equipment of the peripheral users.

1 Claim, 1 Drawing Figure

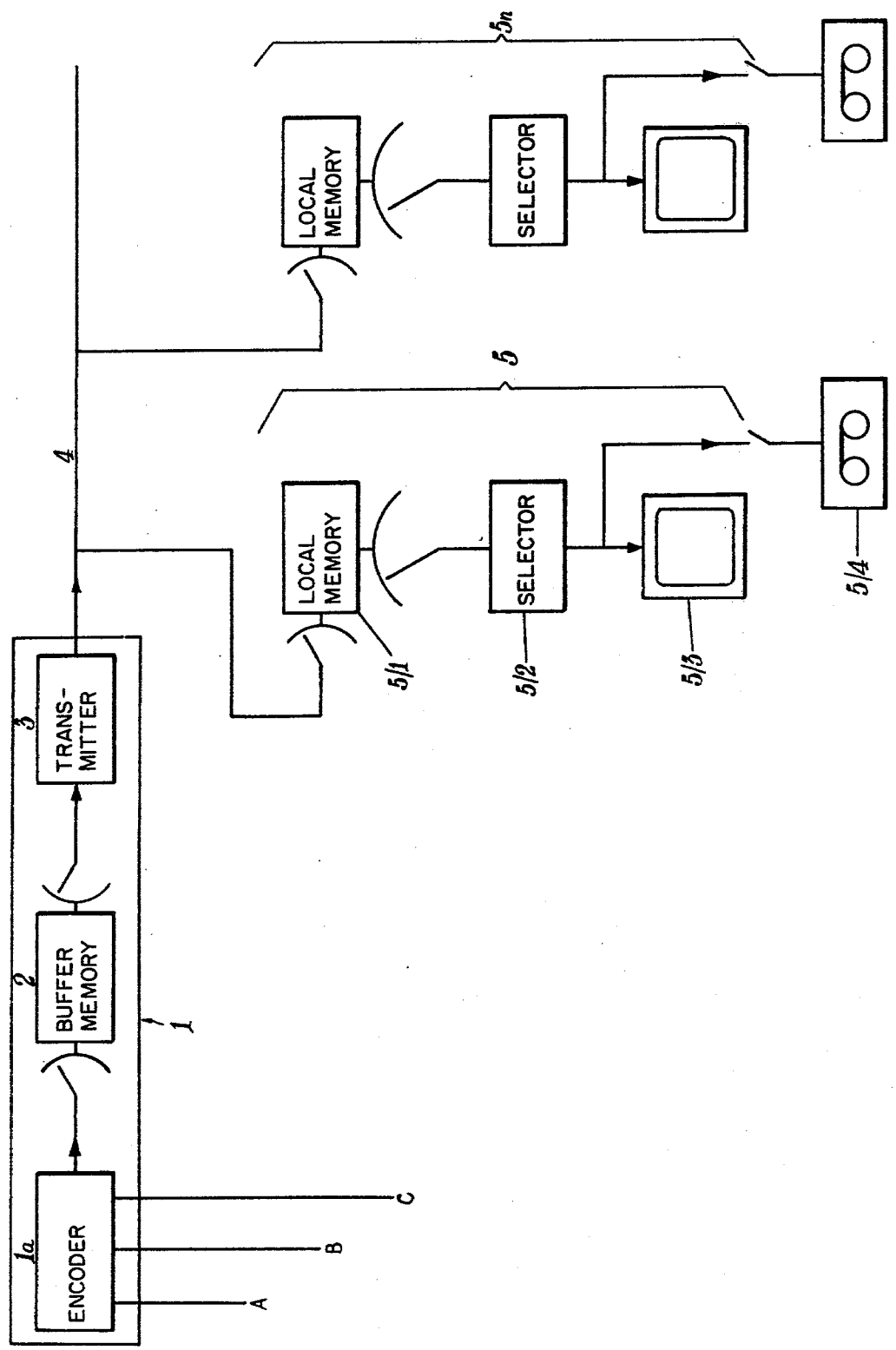

SYSTEMS FOR THE HANDLING AND DISTRIBUTING OF DATA

The present invention relates to an improvement in systems for handling and distributing of data.

Particularly, the system according to the invention is arranged to supply an indefinite number of users, on a simple request thereof, with up to date information, without the necessity of both interrogating a distribution center and having special single lines connected to said distribution center. Thus, the system according to the present invention puts the user in condition to have available all the required information, even if the distribution center is temporarily stopped.

All the known systems for transferring information to a plurality of users respond to a logic configuration, which joins them in common, that is to say there exists always an automatic, manually operated distribution center to which are applied the requests of the users.

The distribution center makes available a variety of information, and the user directly requests a part thereof by "interrogating" the center itself and receiving then the response.

Some of the recent systems use the technique of continuously or cyclically transmitting all the information which the system contains, while the user utilizes a receiving apparatus adapted to select by means of a code inserted by and known to the user himself, only that part of information which he needs.

In the first case, when a direct request of the user is necessary, there arise problems of both the speed and the capability of the center in selecting and transmitting to each single user in requested information. In the second case, in which the selection is carried out by the user himself, the receipt of the requested information occurs only if the information is transmitted cyclically, causing thus the necessity of awaiting the proper turn. In both cases, any stopping of the center deprives the user of the requested service.

The system according to the present invention differs from the prior art in that the distribution center is capable of directly transmitting all the available information to the single user or group of users, without a specific request, since any user or user group is provided with a local memory apparatus, so that it may receive at any instant all the necessary information without any waiting time and, obviously, even if the center itself has stopped its service.

Moreover, at any instant the center is able to update all the information stored in memory at the user apparatus, by cancelling the information which is no more useful and adding at any instant new information to attain a whole independence upon the distribution center.

The present invention will be now disclosed with reference to a preferred, but not limitative embodiment thereof as shown in the enclosed schematic drawing.

The system comprises a central assembly 1 for storing and ordering information through an encoder 1a with various ways A, B, C, such as alpha-numerical keywords, teletypewriters, recording tapes etc.; a transit or buffer memory 2, in which are inserted, in order, line by line, all the information received by the ordering center 1; a transfer unit 3 having the purpose of both reading in order all the lines of transit memory 2 and transferring the content thereof along a common line 4 which connects all the users with one another and with the center 1.

The reference numerals 5, ... . 5n denote the assemblies of user apparatus. Each user assembly comprises a local memory 5/1, wholly corresponding to the transit or buffer memory 2 of the center 1, in said local memory there being stored in order under the control of the transfer unit 3 all the information lines corresponding to those of the memory 2; a local selector 5/2 adapted to select one by one all the information lines by directly reading from the local memory 5/1 in accordance with the user requests and directly transmitting them to a display unit 5/3 which is capable of displaying in order the selected information and thus allowing the visual reading thereof. Finally, there is provided a local memory 5/4 adapted to store, for further use, the information selected by the user, whether shown or not shown on the display unit.

There will be now disclosed the operation of the system according to the present invention.

There will be, firstly, described the manner by which the information coming from an outside source through the lines A, B, C, etc. are entered into the transit memory 2.

Each pack of information, such as a written text, is subdivided into pages and lines.

Each page has a maximum number of lines, depending on the practical display on a single screen having a standard size, as for instance a television screen.

Each text line has a maximum number of characters and spaces depending on the practical sizes of the user display unit.

The user may wish to display an entire page, or one or more lines only; for instance report news may require an entire page, likely as a list of museums with their addresses, telephone numbers and hours of operation thereof. A time-table of a transport means or a security listed on the stock exchange may require a line only, and thus the user should be able to select according to his own judgement specific information which he needs to receive on his own apparatus, and only that information among a plurality of the information stored therein.

For the purpose of rendering possible this service, all the pages and all the lines are provided with a reference code as their are entered into the transit memory 2.

Each page differs from all the other pages by an alpha-numerical character.

Each line differs from all the other lines of the same page by an alphabetical character.

All the information, formed by the alpha-numerical character lines, each preceded by its own identification code, is stored in the transit memory 2 and is always ready to be transmitted to the users.

For updating the transit memory 2, new lines may be entered into the memory, after having provided them with page and line codes, which new lines automatically replace, character by character, the previous lines.

After their storage, the information lines are read by the transmitter 3 and transmitted through the line 4 to the memory arranged in the apparatus of each user or user group.

The transmission of the whole contents of the memory 2 is performed each time the memory is updated, even if only a single character of a line is replaced by a new one.

The line 4 connects all the users 5a–5b to the center 1 and is formed by a single pair of conductors.

There will be now disclosed the arrangement of the user apparatus.

To the conductor line 4 there is connected the memory device 5/1. This means that all the information, codified and ordered line by line and page by page in the memory 2, is transferred, under control of the center 1, to the memory devices of the users so that a whole chronological independence of the operative lines of the center upon those of the users is attained.

This is a characterizing feature which distinguishes the present invention from known systems in which the center and the users operate contemperaneously causing thus the users to be inoperative when the center stops.

To the memory device 5/1 of the user a selector 5/2 is connected, which is controlled by the user by inserting the code of the page and/or line which he wishes to display.

Downstream of the selector there is connected a display device 5/3 and/or other storage devices for further utilization by the user of the information taken from the memory 5/1.

It is thus clear that the display of the information by the user is in no way dependant on the operation, at the display instant, of the center 1.

There will be now pointed out the characterizing features of the system according to the present invention.

There will be, firstly, disclosed the particular manner of entering the information into the memory 2.

All the information are entered by an operator who transduces, by means of a conventional alphanumerical keyboard (not shown) the lines having a defined number of characters of each word group forming the information itself.

The operator must provide each line with characters indicating the pages and lines.

A continuous scanning device, which "scans" the input memory 2, causes the scanning itself to stop at the coincidence of the page and line code and the input device for the message to open on the selected line, so that the operator may insert the new information which will be stored in the available space of the memory. In the same space previously other information were memorized, and the new information replaces the previous information, forming thus a new message.

The succession order in which the characters are stored allows them all to be considered as put in columns, so that the first two characters (page and line) will be always on the same column, at the head of the message, which might, or might not, have the size of a whole line.

Once stored in the memory line by line, the messages are ready to be displayed at any instant for their successive utilization.

The following step is performed automatically, cyclically or imperatively by means of the transmitter device 3.

Transmitter device 3 consists of a scanning display unit, adapted to display the contents of the entire memory, sending through the line 4 the entire contents to the memories 5/1 . . . etc. which are at the disposal of the users, so that the memories of the users will be updated line by line. As the transmitter device 3 transmits any line preceded by its own code, it is not necessary to put the lines in any natural progression, it being sufficient to provide each line with a page and line code.

It will be now disclosed the manner by which the user may extract information.

The user utilizes both a memory 5/1 in which are stored all the lines transmitted by the transmitter 3, and selector 5/2 with an alphanumerical keyboard which has the task of selecting the requested information starting from the page and line code.

When the user wishes to receive an entire page he introduces into the selector the character indicating the page, and if he wishes to receive one or more specific lines he introduces both the page code and the code of the desired line.

As already said, the lines may be arranged in the memory in any order, even if columned, starting from the initial code.

The display unit performs the display along the column, starting from the code characters so as to localize firstly the page and line requested by the keyboard 5/1.

It should be emphasized that the reading is performed column by column, starting from the code characters, thus practically avoiding the waiting times which would be necessary if the reading should be carried out line by line, since the reading of all the lines requires a time much longer than that required for reading only the column of the code characters.

This feature characterizes the invention and qualifies the same as a real time display unit since, in effect, the short time required for the column reading is not preceived by the user who has the sensation of instantaneousness.

The present invention has been disclosed with reference to a presently preferred not limitative embodiment and it is understood that several variations and modifications might be adopted without departing from the scope of the present invention.

Having thus described the present invention, what is claimed is:

1. A system for handling and distributing of data comprising:
 (a) a signal line,
 (b) an ordering center including:
  (1) an encoder adapted for receipt of data signals and encoding thereof;
  (2) a memory unit for storing encoded data signals in a format in which the data signals are divided into a plurality of memory pages, each page having a page identifying code and each page divided into a plurality of character lines, each character line having a line identifying code; and
  (3) a transmitter coupling said memory unit to said signal line and adapted for continuous and repeated transmission on said signal line of recorded data signals from said memory unit; and
 (c) a plurality of peripheral user apparatuses, each user apparatus coupled to said signal line and including:
  (1) a display unit for visually displaying information applied thereto;
  (2) a local memory adapted for storing encoded data signals received on said signal line from said ordering center, including the page identifying codes and line identifying codes; and
  (3) a selector adapted for selecting page identifying codes and line identifying codes of encoded data signals stored within said ordering center memory unit for application of the correspondingly stored encoded data signals to said display unit for visual display thereon.

* * * * *